United States Patent [19]
Gantner et al.

[11] Patent Number: 5,566,182
[45] Date of Patent: Oct. 15, 1996

[54] ISDN SYSTEM WHICH PROCESSES DISCONNECT MESSAGE AFTER CALL TERMINATION

[75] Inventors: Lothar Gantner, Eckental; Joachim Göldenitz, Darmstadt; Rolf Häussler, Darmstadt; Werner Danzer, Ulm, all of Germany

[73] Assignee: U.S. Philips Corporation, New York, N.Y.

[21] Appl. No.: 483,917

[22] Filed: Jun. 7, 1995

Related U.S. Application Data

[63] Continuation of Ser. No. 124,116, Sep. 20, 1993, abandoned.

[30] Foreign Application Priority Data

Sep. 25, 1992 [DE] Germany ................ 42 32 091.7

[51] Int. Cl.$^6$ ........................................... H04J 3/12
[52] U.S. Cl. ................ 370/110.1; 370/58.2; 370/60; 370/94.1
[58] Field of Search .................. 370/58.1, 58.2, 370/60, 94.1, 94.3, 110.1; 379/96, 112

[56] References Cited

U.S. PATENT DOCUMENTS

| | | | |
|---|---|---|---|
| 4,985,887 | 1/1991 | Mizuhara et al. ............ | 370/58.2 |
| 5,043,983 | 8/1991 | Dorst et al. ............ | 370/110.1 |
| 5,181,199 | 1/1993 | Motoki et al. ............ | 370/110.1 |
| 5,189,695 | 2/1993 | Maei ............ | 370/110.1 |
| 5,309,442 | 5/1994 | Saeki ............ | 370/110.1 |

OTHER PUBLICATIONS

"Grundlagen der Vermitlungstechnik", by G. Siegmund, Decker Verlag, Heidelberg, pp. 213–232, 1991.

"Platzansteuerungstechnik fur Telefonauskunftstellen", by J. Goldenitz, Unterrichtsblatter F, Jahrgang 42/1989, No. 9, pp. 287–295.

*Primary Examiner*—Douglas W. Olms
*Assistant Examiner*—Shick Hom
*Attorney, Agent, or Firm*—Michael J. Balconi-Lamica; Michael E. Marion

[57] ABSTRACT

The invention relates to an integrated services digital network (ISDN) and a station for an integrated services digital network. The station comprises a feeding unit (20) for supplying a message and includes at least one station control circuit (18, 40). With the disconnect transaction the station control circuit (18, 40) is provided for inserting a message supplied by the feeding unit (20) into a disconnect information signal and for transmitting the disconnect information signal.

10 Claims, 2 Drawing Sheets

ISDN SYSTEM WHICH PROCESSES
DISCONNECT MESSAGE AFTER CALL
TERMINATION

This is a continuation of application Ser. No. 08/124,116, filed Sep. 20, 1993, now abandoned.

BACKGROUND OF THE INVENTION

1. Field of the Invention

The invention relates to an integrated services digital network (ISDN) and a station for an integrated services digital network, the network comprising a feeding unit for supplying a message, and including a station control circuit.

2. Discussion of the Related Art

In the integrated services digital network the digital messages (for example, speech, text, picture) are transported through a 64 kbit/s channel (B-channel). Such a B-channel is continuously switched from one terminal to another. For a subscriber line (basic access) there are two B-channels and one D-channel (16 kbit/s) available for signalling information. The signalling procedures are carried out over the D-channel according to a uniform standard. Signalling information is then inserted into layer-3 packets. Such a layer-3 packet has a header field with a protocol discriminator, a reference management and a message type as well as the actual payload in the payload field. For example, a SET-UP instruction for setting up a connection is transmitted in the layer-3 packet.

Furthermore, there is the possibility of connecting a subscriber unit, for example a private branch exchange, with a plurality of connected terminals, to a primary rate access. The primary rate access presents thirty user information channels with 64 kbit/s, one signalling channel and one synchronization channel. The coupling between a user information channel of the primary rate access and a terminal of the subscriber unit forms an exchange contained in the subscriber unit.

For the purpose of providing information, for example, about telephone numbers, there is also an inquiry facility available in the integrated services digital network. This inquiry facility has an exchange, a plurality of terminals connected to the exchange and an information-processing circuit which supplies, for example, telephone numbers to the exchange.

A station is understood to mean, for example, a single terminal, a subscriber unit and an inquiry facility.

An ISDN terminal comprises a telephone receiver and a microphone comprising each a bandpass filter and an analog-to-digital converter, or digital-to-analog converter respectively, for connection to a B-channel. The other B-channel may be used for data transmission, for example, via a serial or parallel data interface. Furthermore, a terminal control circuit (for example, microprocessor) is available which feeds signalling information to the D-channel, sends the signals to a display device and receives the signals from a feeding unit. A multiplexer/demultiplexer separates or combines respectively, the two B-channels and the D-channel.

For transmitting messages such as, for example, a telephone number, the subscriber can call upon the ISDN user-to-user signalling service during a call, which costs money (cf. for example: "Grundlagen der Vermitlungstechnik" by Gerd Siegmund, Decker Verlag, Heidelberg, 1991, pp. 213 to 232). To transmit information a message is then inserted into a layer-3 packet.

SUMMARY OF THE INVENTION

It is an object of the invention to provide a terminal for an integrated services digital network, by which messages can be simply sent without resorting to an additional ISDN feature.

The object is achieved by a station of the type mentioned in the opening paragraph, in that with a disconnect transaction the station control circuit is arranged for inserting a message supplied by the feeding unit into a disconnect information signal and for transmitting the disconnect information signal.

The station according to the invention is supplied with a message, for example, a telephone number, Lotto numbers, weather forecast and so on through a feeding unit. This telephone number can be fed, for example, by a subscriber via a keypad. Such a keypad represents a feeding unit. The message may be supplied to the station, for example, from a memory via an interface. When a call is terminated, a disconnect transaction is started. For this purpose the disconnecting station forms disconnect information which contains the fed message. Subsequently, the disconnect information is sent to an exchange. From this exchange the disconnect information is sent to another station and evaluated there.

According to the invention the message is sent via disconnect information which is necessary for the disconnect transaction anyhow. Thus no special information signal is to be made available for sending the message. No additional ISDN feature is thus necessary for the invention.

In a further embodiment of the invention the station is arranged as a terminal and the station control circuit as a terminal control circuit. With the disconnect transaction the terminal control circuit is provided for inserting the supplied message into a layer-3 packet which contains the information about the disconnect transaction and for sending the layer-3 packet through a D-channel to at least one digital exchange.

Once the message has been inserted, the disconnecting terminal forms a layer-3 packet of the type of message DISCONNECT (DISC) to be sent to the exchange. In the payload field of the layer-3 packet the message is inserted by the terminal control circuit. The layer-3 packet is subsequently sent to the exchange through the D-channel. At the exchange the layer-3 packet is converted and the disconnect information together with the message is sent to the exchange of the other terminal through a central signalling channel. In this exchange the layer-3 packet comprising the information about the disconnect transaction and the message is co-transmitted to the terminal of the other subscriber and evaluated there.

If the station is arranged as an inquiry facility or subscriber unit, it is possible either for an exchange in the inquiry facility and the subscriber unit, or at least a terminal coupled to the inquiry facility to carry out the disconnect transaction. If the terminal carries out the disconnect transaction, a terminal control circuit arranged as a station control circuit is provided for inserting the supplied message into a layer-3 packet which contains the information about the disconnect transaction and for sending the layer-3 packet to at least one exchange through a D-channel. This exchange forms part of the inquiry facility and subscriber unit. The exchange sends the information about the disconnect transaction obtained from the layer-3 packet to another exchange over the central signalling channel after the information has been transformed.

The terminal control circuit is also provided for evaluating the message contained in a layer-3 packet once the layer-3 packet containing the information about the disconnect transaction has been received. With a layer-3 packet for the disconnect transaction the evaluation circuit verifies whether the packet contains a message, for example, a telephone number as its payload. If the terminal control circuit finds such a telephone number, it conveys this number to a display (for example LCD display) which then shows the telephone number.

Furthermore, the terminal control circuit can be provided for storing the received message in a first memory means. The received message, for example a telephone number, is stored in a first memory means by the terminal control circuit via an operating function of a subscriber or directly after the layer-3 packet has been evaluated.

The terminal may also be arranged in such a way that the terminal control circuit is provided for carrying out a dialling operation once the telephone number contained in the message has been received. The terminal control circuit dials the telephone number via an operating function of the subscriber or directly after the layer-3 packet has been evaluated.

The disconnect information can, after reception, even be evaluated by a first exchange control circuit arranged as a station control circuit, which exchange control circuit is located in the exchange of a subscriber unit. The first exchange control circuit can then store the received message in a second memory means of the exchange.

If the second memory means is used for storing at least a telephone number contained in the message, there is provided in a further embodiment of the invention that a terminal control circuit of a terminal coupled to the subscriber unit sends a dialling instruction to the first exchange control circuit and the first exchange control circuit carries out a dialling operation in response to a telephone number stored in the second memory means. A subscriber can then give a dialling instruction by depressing keys on his keypad at the terminal and the instruction can be sent to the exchange control circuit, for example, through the D-channel.

If the station is used as an inquiry facility, for example, a sought telephone number can be entered by means of the keypad at the terminal or given by an information processor. From the article "Platzansteuerungstechnik für Telefonauskunftstellen" by J. Göldenitz, Unterrichtsblätter F, Jahrgang 42/1989, no. 9, pp. 287 to 295, an information-processing system is known from which telephone numbers can be retrieved. If the station acting as an inquiry facility comprises, in addition to an exchange, an information-processing circuit used for supplying a message to the exchange, and the exchange comprises a further station control circuit arranged as a second exchange control circuit, the second exchange control circuit inserts the message into a release information signal when there is a disconnect transaction. This release information signal is then sent to a subscriber requesting an inquiry.

The invention likewise relates to an integrated services digital network which comprises at least two stations. With a disconnect transaction the station control circuit of the first station is provided to insert a message into a disconnect information signal and to send the disconnect information signal to the second station. After a disconnect information signal has been received, a station control circuit of the second station is intended to evaluate the message contained in the disconnect information signal. Such an integrated services digital network transmits messages without the use of additional ISDN features.

The invention further relates to an integrated services digital network comprising at least a station arranged as an inquiry facility and an external exchange. With a release transaction a station control circuit is then used for inserting a telephone number into a release information signal, and a switching instruction into the release information signal or control information signal. Furthermore, the station control circuit is provided to send the release and/or control information signal. A third exchange control circuit of the external exchange is used for evaluating, after reception of the disconnect and/or control information signal, the telephone number contained in the disconnect information signal and the switching instruction contained in the release or control information signal.

If a subscriber calls the inquiry facility, the station exchange inserts the requested telephone number and a switching instruction into a release information signal and, for example, a control information signal. These information signals are transported to the external exchange through a central signalling channel. In the external exchange a third exchange control circuit evaluates the release and control information and performs a function in accordance with the switching instruction. Such a function may be, for example, activating an audio response module of the third exchange control circuit of the external exchange. This audio response module is provided to transform the telephone number into a speech signal and to supply this speech signal to a terminal through a channel. Such a channel may be a B-channel of an ISDN transmission link or an analog channel of an analog transmission link.

The external exchange can also perform a further function. In that case the third exchange control circuit of the external exchange is arranged for establishing a connection between a terminal of the external exchange and the terminal assigned to a telephone number after the telephone number has been received.

BRIEF DESCRIPTION OF THE DRAWINGS

Embodiments of the invention will be further explained hereinbelow with reference to the drawing Figures, in which.

DETAILED DESCRIPTION OF THE PREFERRED EMBODIMENTS

Figure 1:
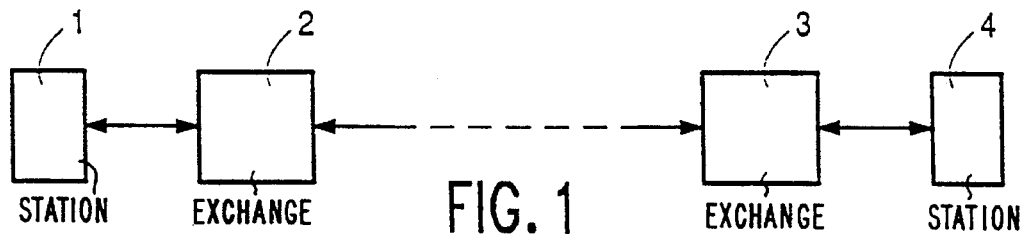
FIG. 1 shows a part of an integrated services digital network comprising two stations and the exchanges assigned to the stations.

The part of an integrated services digital network (ISDN) shown in FIG. 1 comprises a station 1 and an exchange 2 coupled to this station 1. An exchange 3 is coupled to the exchange 2 through further exchanges, if any. A station 4 is assigned to the exchange 3.

Figure 2:
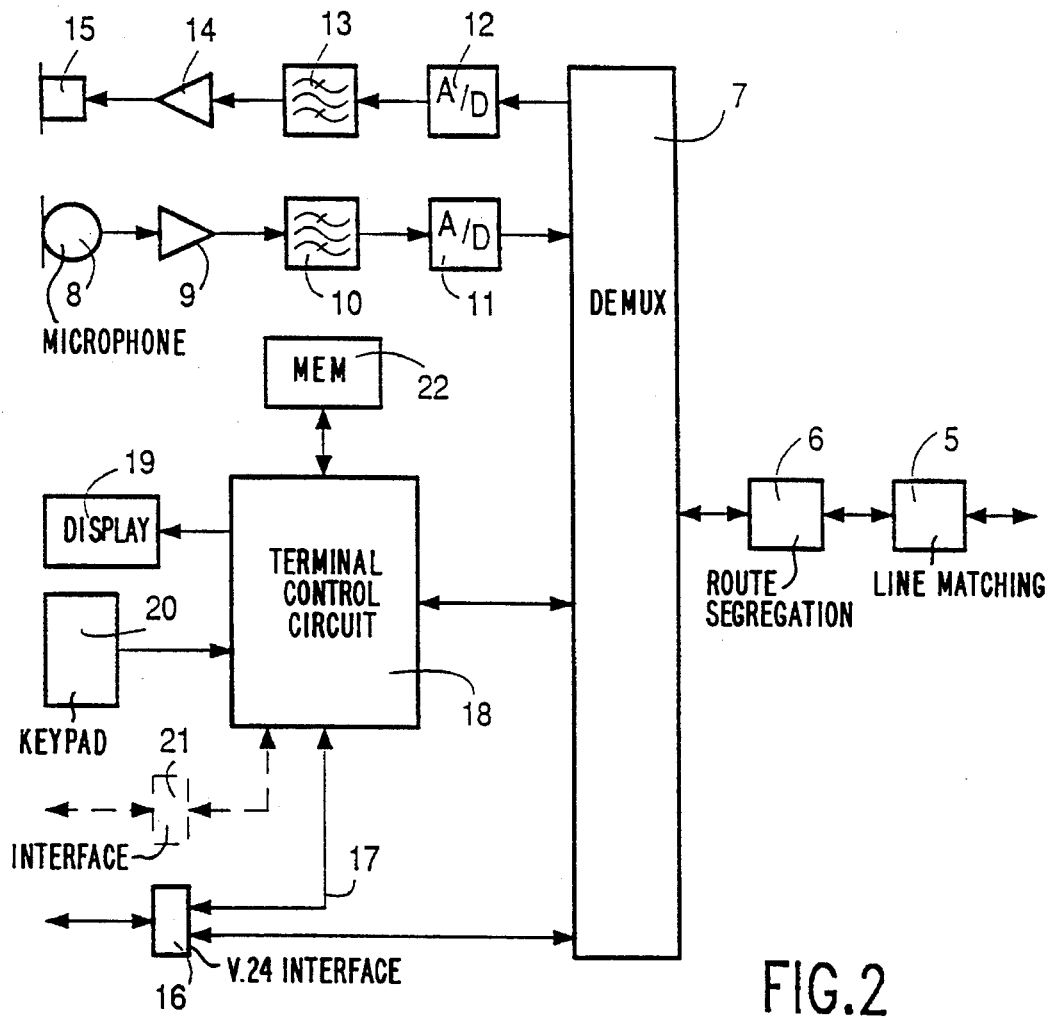
FIG. 2 shows a block diagram of a station that can be used in FIG. 1 as a terminal for an integrated services digital network.

A station 1 or 4 may be a terminal station. A block diagram of a terminal 1 or 4 is shown in FIG. 2. The terminal 1 or 4 is coupled to an exchange 2 or 3 via a basic access. Via the basic access two B-channels can be accessed for digital messages and one D-channel for signalling information.

The terminal connected to the basic access comprises two circuits 5 and 6 for line matching and route segregation. The circuit 6 is coupled to a demultiplexer/multiplexer 7 which either separates the various channels or combines the channels. Via a first B-channel the speech signals are led from the subscriber's microphone 8 via an amplifier 9, a bandpass filter 10 and an analog/digital converter 11 to the demultiplexer/multiplexer 7. Furthermore, the demultiplexer/multiplexer 7 supplies speech signals to a digital/analog converter 12, which are applied to a telephone receiver 15 through a bandpass filter 13 and an amplifier 14. Via the other B-channel data can be transmitted between an interface 16 (for example, V.24 interface) and the demultiplexer/multiplexer 7. The interface 16 further has a control line 17 leading to a terminal control circuit 18 which comprises, for example, a microprocessor.

The terminal control circuit 18 evaluates the signalling information applied thereto via the D-channel and supplies its produced signalling information via the D-channel to the demultiplexer/multiplexer 7. The terminal control circuit 18 further supplies data to a display device 19 (for example LCD display) and receives information from a feeding unit which may be, for example, a keypad 20. An interface 21 shown in a dashed line, which receives data from an external device, can be provided to be a further feeding unit. Data (telephone numbers) managed by the terminal control circuit 18 are stored in a first memory means 22.

By means of the terminal shown in FIG. 2 a telephone number can be transmitted between a subscriber A (station or terminal 1) and the subscriber B (station or terminal 4). For this purpose, the subscriber A enters a telephone number by means of the feeding unit (for example, keypad 20) of his terminal 1. The telephone number may also be supplied by the interface 21. If the call is disconnected by the subscriber A (end of call), the terminal control circuit 18 forms a layer-3 packet, for example, of the type DISCONNECT (DISC). Such a layer-3 packet comprises a header field with a protocol discriminator, a call reference and a message type followed by a payload field. The payload field, for example, in the EDSS1 protocol (European D-channel protocol) can be a reason for the disconnection (cause) and a further field (diagnostic field), which comprises the message (for example, telephone number). The cause may be designated "cause 22". This means that the number has changed. The telephone number entered by the subscriber by the keypad 20 or the interface 21 (feeding units) is then inserted into the payload field of the layer-3 packet. Through the D-channel the disconnect information comprising the message (telephone number) present in the layer-3 packet is sent to the exchange 2 of the subscriber A. The exchange 2 inserts by means of an exchange control circuit (not shown) the disconnect information comprising the telephone number from the layer-3 packet of the D-channel into a message signalling unit as a user message and sends this message signalling unit to the exchange 3 of the subscriber B through the central signalling channel. The user message contains as an ISDN message the message type RELEASE MESSAGE (REL), which initiates the release of the message and contains the telephone number as the message to be sent. For this operation the payload field is transferred from the layer-3 packet to the message signalling unit. The exchange 3 transforms the release information from subscriber A into a layer-3 packet with the payload type DISC and sends this packet to the terminal 4 of the subscriber B through the D-channel.

At the terminal 4 the terminal control circuit 18 verifies whether a level-3 packet with release information, for example, a level-3 packet with the message type DISC is available. If this is the case, the telephone number is taken from the level-3 packet and applied to the display device 19 to be displayed. The subscriber B may further store the telephone number in the memory means 22 when he depresses a key on the keypad 20. This may also be effected automatically. By depressing further keys he may also achieve that the terminal control circuit 18 dials the received telephone number to set up a connection with the terminal of the sought telephone number. This operation could also be carried out automatically.

The insertion or retrieval of the telephone number by the terminal control circuit 18 of the ISDN terminal 1 or 4 may be realised by the following program run: Invocation of the function "inquiry"?

Yes: Release feeding unit to enter a telephone number;

Subscriber's telephone receiver on-hook?

Yes: Insertion of the telephone number entered by the subscriber into a layer-3 packet, for example, of the message type DISC; Sending of layer-3 packet to the exchange through D-channel;

Reception of a layer-3 packet, for example, of the message type DISC?

Yes: Does the layer-3 packet contain a telephone number?

Yes: Retrieval of telephone number from the payload field of the layer-3 packet;

Display of the telephone number on the display device;

Invocation of function?

Invocation of function "store received telephone number"?

Yes: Store telephone number;

Invocation of function "dial received telephone number"?

Yes: Telephone number is dialed;

If the subscriber wishes to enter a telephone number by way of the keypad 20 or interface 21, the function "inquiry" is invoked. After this, the feeding unit for feeding a telephone number is released. If there is established that the subscriber's hand-held portable telephone is on-hook, the telephone number fed by the subscriber is inserted into a layer-3 packet, for example, of the message type DISC. Subsequently, the layer-3 packet is sent through the D-channel.

The terminal control circuit 18 further also verifies whether a layer-3 packet, for example, of the message type DISC, has arrived at the D-channel. If this is the case, the next thing verified is whether the layer-3 packet contains a telephone number. If so, the telephone number is taken from the payload field of the layer-3 packet and the telephone number is transferred to the display device. The control circuit 18 further monitors whether a function "store received telephone number" or "dial received telephone number" has been invoked by the subscriber via the keypad 20. If the received telephone number is to be stored, the control circuit 18 applies this telephone number to the memory means 22 to be stored there. If the received telephone number is to be dialled, a call set-up is initiated by the terminal control circuit 18 (dialling operation).

Figure 3:
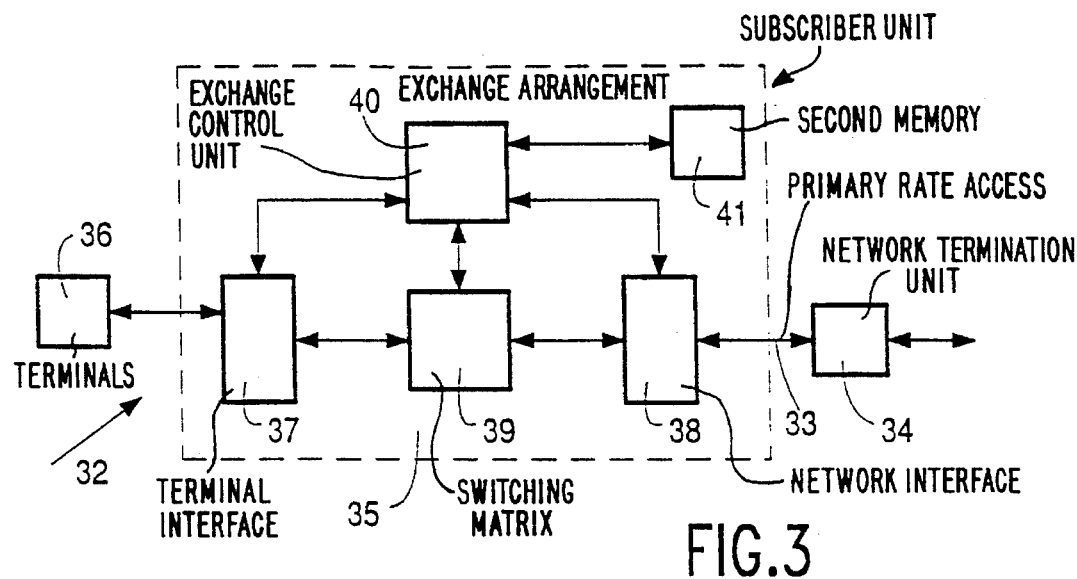
FIG. 3 shows a block diagram of a station that can be used in FIG. 1 as a subscriber unit for an integrated services digital network.

A further embodiment for a station 1 or 4 represented in FIG. 1 can be the subscriber unit 32 (private portion of the integrated services digital network) shown in FIG. 3, which unit is connected to a primary rate access 33. Via the primary rate access 33 up to thirty user information channels can be used. Additionally, there is a channel for signalling information available and a channel for synchronization information. An exchange 2 or 3 is coupled to the subscriber unit 32 via a network termination unit 34 and the primary rate access 33, which subscriber unit 32 comprises an exchange arrangement 35 and a plurality of terminals 36. For clarity FIG. 3 shows only one terminal 36. The exchange 35 comprises a terminal interface 37 to which the terminals 36 are connected, a network interface 38 connected to the network termination unit 34, a switching matrix 39 arranged between terminal interface 37 and network interface 38, and a first exchange control circuit 40 used for controlling the terminal interface 37, the switching matrix 39 and the network interface 38. Furthermore, a second memory means 41 is connected to the exchange control circuit.

With a disconnect transaction a terminal 36 as described above with respect to FIG. 3 can insert a telephone number into a release information signal. In the exchange arrangement 35 the level-3 packet is fed to the signalling channel and sent to the exchange.

If release information comprising a message (for example, telephone number) is sent to the subscriber unit 32, this information can be displayed on the display device of the terminal or stored automatically in a memory means of the terminal or stored there by the depression of a key. The telephone number may also be taken from the release information by the exchange control circuit 40 and stored in the memory means 41. Automatically, or as a result of at least one depression of a key (dialling instruction over D-channel of the terminal 36 to the exchange control circuit 40), either the terminal 36 or the exchange control circuit 40 can initiate a dialling operation with the received telephone number.

Figure 4:
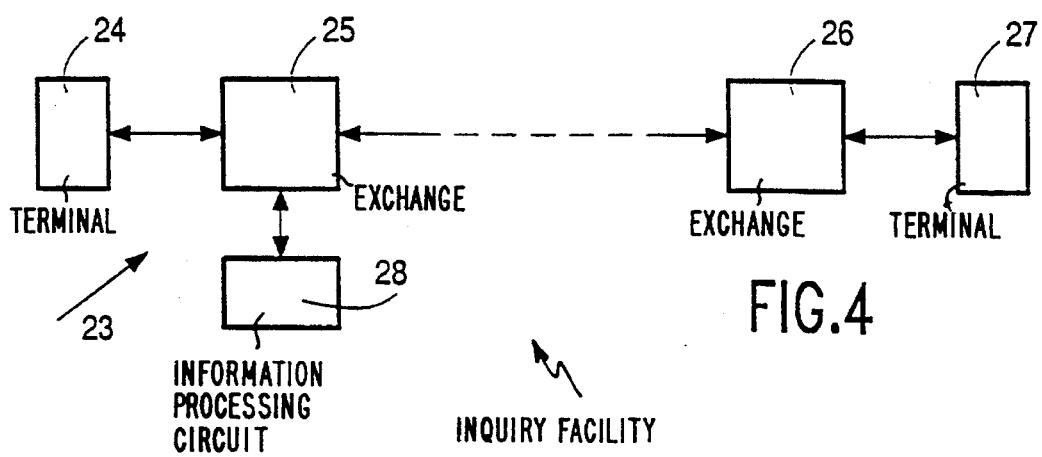
FIG. 4 shows a part of an integrated services digital network comprising a station arranged as an inquiry facility and a further station with an associated exchange.

A further embodiment for a station is an inquiry facility 23 (FIG. 4). In this embodiment said terminal can also be used for inserting a telephone number into or retrieving a telephone number from a layer-3 packet for a disconnect transaction also in the inquiry facility 23. Such an inquiry facility 23 comprises at least an exchange 25 and a terminal 24 (cf. "Platzansteuerungstechnik für Telefonauskunftstellen" by J. Gödenitz, Unterrichtsblätter F, Jahrgang 42/1989, no. 9, pp. 287 to 295). So far a subscriber has been informed of the sought telephone number either orally or via an audio response module. According to the invention the sought telephone number is entered, for example, by way of the keypad 20 and sent through the D-channel to the exchange 25 in a layer-3 packet, for example, of the message type DISC, and from there the release information is transmitted over the central signalling channel to the second external exchange 26 assigned to the subscriber by means of a second exchange control circuit. Once the layer-3 packet has been received in the subscriber's terminal 27, the telephone number is displayed on the subscriber's display device 19.

An information processing circuit 28 (data bank) may transport the telephone number via the first exchange 25 to the terminal control circuit of the terminal 24 via the interface 21. The terminal 24 then transmits the telephone number to the subscriber's terminal 27. Furthermore, the information processing circuit 28 may transport the telephone number to the exchange 25 and the telephone number can be inserted into the release information by the exchange control circuit (not shown) contained in the exchange 25.

This release information can be sent either in a layer-3 packet from the exchange 25 to the next exchange (not further shown here) and be inserted there into a message signal unit, or inserted directly at the exchange 25 into a message signal unit. In the first case the exchange 25 comprises a primary rate access and in the second case it forms part of the public section of the integrated services information network.

Figure 5:
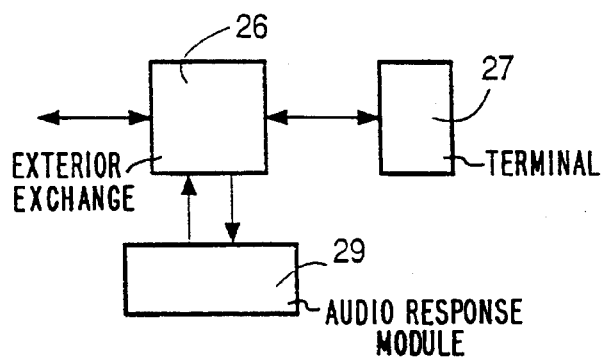
FIG. 5 shows a terminal and the associated exchange with an audio response module connected thereto.

In FIG. 5 a further possibility is shown how to transmit the telephone number sought by the subscriber. The exterior exchange 26 is coupled to an audio response module 29 which is supplied by a third exchange control circuit of the external exchange 26 with the telephone number after the number has been retrieved from the layer-3 packet. The audio response module 29 forms a speech signal from the telephone number, which speech signal is applied to the terminal 27 via the external exchange 26 and a B-channel. Here it is not necessary for the terminal 27 to be an ISDN terminal. The terminal 27 can also be informed of the telephone number through an analog channel. In order to let the telephone number be transformed into a speech signal by the audio response module 29, the inquiry facility 23 is to send an appropriate switching instruction to the exchange 26. This switching instruction is either additionally inserted into the release information or transmitted through the central signalling channel by means of another control information signal.

Figure 6:
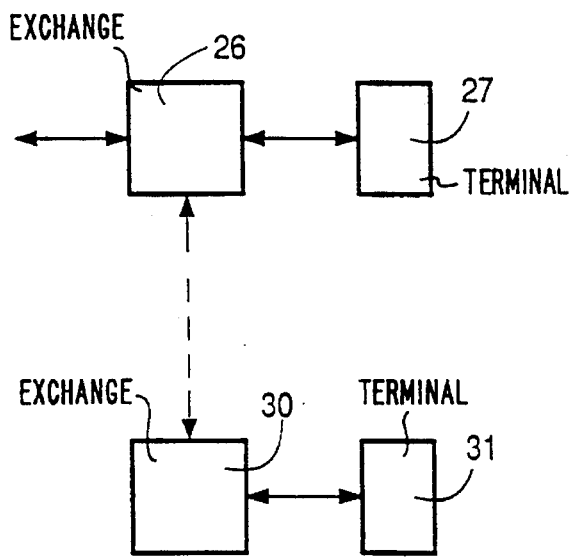
FIG. 6 shows a part of an integrated services digital network comprising two terminals and associated exchanges.

Furthermore, the exchange 26, once the telephone number has been transmitted, can set up the connection to the subscriber whose telephone number is sought. For this purpose, the exchange receives an appropriate switching instruction either in the release information signal (central signalling channel) or in a separately applied control information signal, and subsequently sets up a connection to the exchange 30 of the sought subscriber (cf. FIG. 6). The exchange 30 further connects the terminal 31 of the desired subscriber.

We claim:

1. A station for an integrated services digital network (ISDN), said station comprising:

a feeding unit for supplying a message, and at least one station control circuit for, as part of a disconnect transaction started by said station, inserting the message supplied by said feeding unit into a disconnect information signal, wherein said station comprises a disconnecting station for starting the disconnect transaction when a call between said station and a target station is terminated said at least one station control circuit further for, as part of the disconnect transaction started by said station, transmitting the disconnect information signal containing the message, so that the message arrives at the target station without maintenance or set up of a new connection between said station and the target station.

2. The station as claimed in claim 1, wherein said station is a terminal;

said station further comprising a display device and a first memory means and further wherein said station control circuit is a terminal control circuit, and, with the disconnect transaction, the terminal control circuit (i) inserts the message into a layer-3 packet which contains information about the disconnect transaction;

(ii) sends the layer-3 packet through a D-channel to at least one digital exchange; and (iii) in response to a received 3-layer packet originating from another station and received by said station, wherein the received 3-layer packet contains a received message, the terminal control circuit evaluates the received message contained in the received layer-3 packet, and sends the received message to the display device and/or stores the received message in the first memory means.

3. The station as claimed in claim 2, further wherein the terminal control circuit carries out a dialling operation in response to a telephone number contained in the received message.

4. The station as claimed in claim 1, wherein said station is a subscriber unit, said station further comprising an exchange, wherein the exchange comprises (i) memory means and (ii) an exchange control circuit which comprises a further station control circuit for evaluating a received message contained in a received disconnect information signal received by the exchange, and storing the received message in the memory means of the exchange; and at least a terminal coupled to the exchange; and further wherein said station control circuit is a terminal control circuit that inserts the message into a layer-3 packet which contains information about the disconnect transaction and sends the layer-3 packet to at least one exchange through a D-channel.

5. The station as claimed in claim 4, wherein the received message contains a telephone number, the exchange control circuit stores the telephone number in the memory means, the terminal control circuit applies a dialling command to the exchange control circuit, and in response to the telephone number and in response to the dialling command, the exchange control circuit carries out a dialling operation.

6. The station as claimed in claim 1, wherein said station is an inquiry facility, said station further comprising an exchange which includes a further station control circuit for inserting the message into a release information signal with the disconnect transaction;

at least a terminal coupled to the exchange; and an information processing circuit for applying the message to the exchange; further wherein the station control circuit is a terminal control circuit for inserting, with the disconnect transaction, the message into a layer-3 packet which contained information about the disconnect transaction and sending the layer-3 packet to at least one exchange through a D-channel.

7. An integrated services digital network (ISDN) comprising:

a first station, wherein said first station comprises a feeding unit for supplying a message, and at least one first station control circuit for, as part of a disconnect transaction started by said first station, inserting the message supplied by the feeding unit into a disconnect information signal, wherein said first station further comprises a disconnecting station for starting the disconnect transaction when a call between said first station and a target station is terminated, the at least one first station control circuit further for, as part of the disconnect transaction started by said first station, transmitting the disconnect information signal containing the message; and a second station, wherein said second station comprises means for receiving the disconnect information signal containing the message, and at least one second station control circuit for, upon reception of the disconnect information signal containing the message, evaluating the message, without maintenance or set up of a new connection between said first and second stations.

8. The ISDN of claim 7 wherein said first station is an inquiry facility; and the at least one first station control circuit further comprises means for inserting a telephone number into the disconnect information signal; and means for inserting a switching instruction into the disconnect information signal; and said ISDN further comprising an external exchange for receiving the disconnect information signal; and an external exchange control circuit for evaluating the telephone number and switching information of the received disconnect information signal.

9. The integrated services digital network as claimed in claim 8, further comprising;

an audio response module, driven by the exchange control circuit, for transforming the telephone number into a speech signal; and a channel for applying the speech signal from the exchange control circuit to a terminal.

10. The integrated services digital network as claimed in claim 8, wherein the exchange control circuit further comprises means for, after reception of the telephone number, setting up a connection between a terminal of the external exchange and a terminal assigned to the telephone number.

* * * * *